United States Patent [19]
Hickey

[11] Patent Number: 5,388,300
[45] Date of Patent: Feb. 14, 1995

[54] ADHESIVE TAPE ROLL

[75] Inventor: Patrick Hickey, Frankfurt, Germany

[73] Assignee: GGG Gebrauchs Gerate GmbH, Germany

[21] Appl. No.: 135,963

[22] Filed: Oct. 14, 1993

[30] Foreign Application Priority Data

Oct. 14, 1992 [DE] Germany .................. 4234609

[51] Int. Cl.6 .................. A47L 25/08; B32B 7/12
[52] U.S. Cl. .................. 15/104.002; 428/40;
428/194; 428/343; 428/906
[58] Field of Search .................. 428/906, 40, 343, 352,
428/194, 43; 15/104.002; 206/411

[56] References Cited

U.S. PATENT DOCUMENTS

| | | | |
|---|---|---|---|
| 2,574,152 | 11/1951 | Lewis et al. | 206/411 X |
| 2,624,060 | 1/1953 | McKenzie | 15/104.002 |
| 2,800,215 | 7/1957 | Converse | 15/104.002 |
| 2,822,290 | 2/1958 | Webber | 206/411 X |
| 2,913,745 | 11/1959 | Welvang | 15/104.002 |
| 4,427,726 | 1/1984 | Wolfrum | 428/43 |
| 4,546,011 | 10/1985 | Wolfrum | 427/179 |
| 4,727,616 | 3/1988 | Kucera et al. | 15/104.002 |
| 4,770,914 | 9/1988 | Torgerson et al. | 428/343 X |
| 4,905,337 | 3/1990 | McKay | 15/104.002 |
| 5,027,465 | 7/1991 | McKay | 15/104.002 |
| 5,182,156 | 1/1993 | Pope et al. | 428/906 X |
| 5,212,002 | 5/1993 | Madrzak et al. | 428/906 X |

FOREIGN PATENT DOCUMENTS 3111150 3/1981 Germany .
3832661 9/1988 Germany .
3919899 6/1989 Germany .

OTHER PUBLICATIONS

DE 3,111,150 Abst. Mar. 21, 1981.
DE 3,832,661 Abst. Sep. 26, 1988.
DE 3,919,899 Abst. Jun. 19, 1989.

Primary Examiner—Daniel R. Zirker
Attorney, Agent, or Firm—Sixbey, Friedman, Leedom & Ferguson

[57] ABSTRACT

An adhesive tape roll for a clothes cleaning device, with a winding mandrel (3) and separate adhesive tapes (5). Each adhesive tape is formed of a strip (7) made of paper, on only one side of which an adhesive layer (8) is provided, an adhesive-repelling material layer (9) being provided on an end section of an opposite side of the strip (7). Adhesive tapes (5) are wound one on top of another around winding mandrel (3), alternately in one direction and then in an opposite direction, so that the adhesive-free sides of at least second and subsequently wound adhesive tapes (5) face the mandrel, and for each adhesive tape (5), the adhesive-repelling material layer (9) lies on the adhesive layer (8) at the opposite end section of same adhesive tape (5). As a result, the end section with adhesive-repelling material layer (9) of outermost adhesive tape (5) can be easily grasped to pull off the outermost adhesive tape (5), after its adhesive layer (8) has been used up, without also pulling off the adhesive tape lying under it.

15 Claims, 1 Drawing Sheet

ADHESIVE TAPE ROLL

BACKGROUND OF THE INVENTION

FIELD OF THE INVENTION

The invention relates to an adhesive tape roll, in particular for a clothes cleaning device.

An adhesive tape roll for a clothes cleaning device is known from German application DE 31 11 150 C2 in which a single adhesive tape is wound on a winding mandrel. The adhesive tape consists of a stressed strip coated on only its outside with adhesive. The adhesive tape is provided with separation lines formed by weakened points in the tape at predetermined lengthwise distances crosswise to the lengthwise direction of the tape. The distances between the separations lines are equal to one another. A layer made of an a nonadhering material is applied in each case on the inner side of the tape, a layer that extends in the lengthwise direction of the tape to less than two thirds of lengthwise separation of adjacent separation lines. The separation lines are placed in each case in the middle of the nonadhering layer and are made as lines of perforations. However, when a used tape section is torn off, fuzz can remain on the edges between the perforations that adheres to the adhesive layer of the tape section lying under it and makes it more difficult to grasp the unused tape section.

SUMMARY OF THE INVENTION

The primary object of the present invention is to provide an adhesive tape roll, in particular for a clothes cleaning device, in which the grasping of a new tape section can be performed in a practically unimpeded manner.

To achieve this object, an adhesive tape roll for a winding mandrel, according to the invention, has several separated adhesive tapes, which, in each case, have a stressed strip made of flexible, nonadhering material, in particular paper, an adhesive layer on only the one side of the strip, and on the other side of the strip, in an end section of the strip extending over the entire strip width, a nonadhering material layer. The adhesive tapes are wound on top of one another, alternately in one and then the other direction around the winding mandrel, so that the adhesive-free sides at least of all adhesive tapes wound after the first adhesive tape, face the winding mandrel, and for each adhesive tape, the nonadhering material layer lies on the adhesive layer of the same adhesive tape.

With this design, each of the originally separated adhesive tapes can be grasped at the end section provided with the nonadhering material layer and can be pulled off the adhesive tape roll without difficulties arising during the grasping of the adhesive tape, because the exposed end has no fuzz at all and does not adhere to the adhesive layer lying underneath it. Because the winding direction alternates from adhesive tape to adhesive tape, when an adhesive tape is pulled off, it is also assured that the following adhesive tape is not pulled off with it, because the direction in which the outermost adhesive tape is pulled off corresponds to the winding direction of the following adhesive tape.

Preferably, the adhesive-repelling material layer of each wound adhesive tape lies on the adhesive layer at the other end section of the same adhesive tape. Here, each adhesive tape is smaller than two maximum circumferential lengths of the adhesive tape roll and only slightly larger than one maximum circumferential length of the adhesive tape roll, so that this adhesive tape roll is especially suited for a clothes cleaning device in which it is sought to minimize the extent that each adhesive tape is longer than the maximum winding circumference, to use the entire adhesive layer of each adhesive tape to clean an item of clothing, i.e., not to let the end sections of an adhesive tape overlap too much, to save material.

Then, the overlap area of the end sections of each adhesive tape, relative to the overlap area of the end section of the previously wound, adjacent adhesive tape can be offset in the circumferential direction of the winding mandrel. This design has the advantage that the adhesive tape roll, despite the overlap of the end sections of each adhesive tape, remains largely circular, which makes it easier to clean an item of clothing by rolling the adhesive tape roll on the item of clothing with the adhesive layer on the outside.

Further, the end section, having a material layer with no adhesive, of the adhesive tape wound first, can be turned under on its adhesive-free side. The turned-under section then adheres to the outside of the winding mandrel somewhat tightly, so that the first adhesive tape, with its turned-up section, is fixed on the winding mandrel when the adhesive tape is wound and does not slip in the circumferential direction during winding.

These and further objects, features and advantages of the present invention will become apparent from the following description when taken in connection with the accompanying drawings which shows, for purposes of illustration only, a single embodiment in accordance with the present invention.

DETAILED DESCRIPTION OF THE PREFERRED EMBODIMENT

Figure 1:
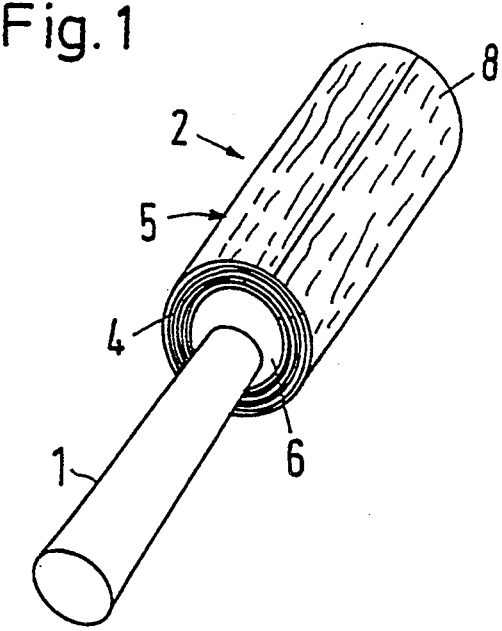
FIG. 1 is a perspective view of a clothes cleaning device with adhesive tapes according to the present invention.
Figure 2:
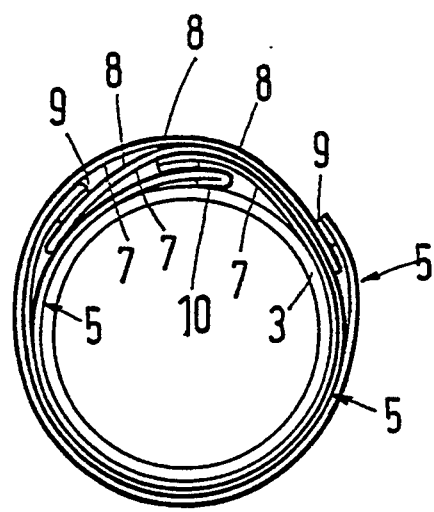
FIG. 2 is an end view of an adhesive tape roll according to the invention.
Figure 3:
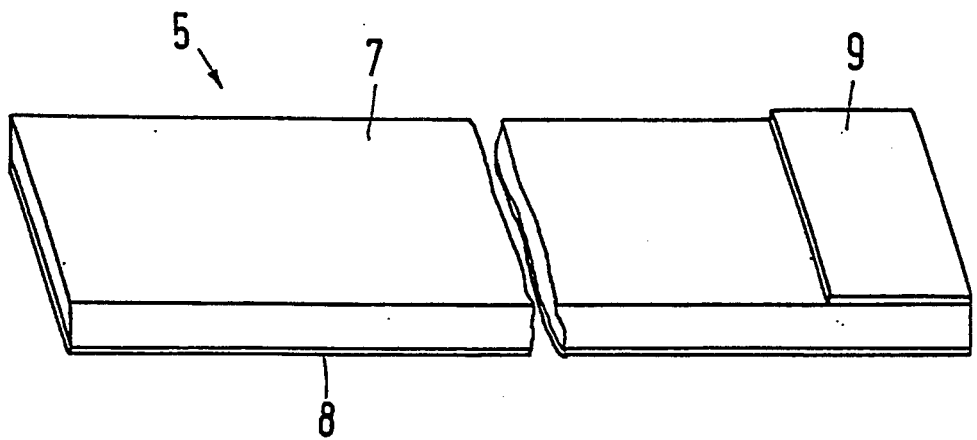
FIG. 3 is a perspective view of an adhesive tape according to the invention.

The clothes cleaning device represented in FIG. 1 has a slightly conically tapered handle 1 and a clothes cleaning roll 2 that is mounted to rotate on an axial extension of handle 1. Clothes cleaning roll 2 has a hollow cylindrical winding mandrel 3 (see FIG. 2) that is made of stiff cardboard. Winding mandrel 3 is provided with an adhesive tape roll 4 which is composed of a plurality of separate adhesive tapes 5, as it is represented in FIG. 2. An unwound adhesive tape 5 is represented in FIG. 3, in perspective. Winding mandrel 3 is bordered on its ends by disks 6, which are mounted to rotate on the axial extension of handle 1 and which carry the winding mandrel 3.

In FIG. 2, as an example, only three adhesive tapes 5 are represented; although, in practice, a far larger number of adhesive tapes 5 is wound on winding mandrel 3.

As FIGS. 2 and 3 show, each adhesive tape 5 comprises a stressed strip 7 made of a flexible, nonadhesive material, in particular paper, preferably crepe paper, Which is provided on only one side with an adhesive layer 8 and, on its opposite side, in an end section extending over the entire strip width, with a nonadhering material layer 9. Adhesive tapes 5 are wound on winding mandrel 3, one on top of another, alternately in one direction and then in the opposite direction, so that the adhesive-free side of strips 7 of at least the second and subsequent adhesive tapes 5, i.e., all but the first-wound adhesive tape 5, face winding mandrel 3 and, for each adhesive tape 5, nonadhering material layer 9 lies on top of the adhesive layer 8 of the same adhesive tape 5. The area of the overlapped end sections of each adhesive tape 5 is offset in the circumferential direction of winding mandrel 3 relative to the area of the overlapped end sections of the previously wound, adjacent adhesive tape 5. End section 10 of first wound adhesive tape 5, is folded under on its adhesive-free side so as to bring a portion of the adhesive side into contact with the winding mandrel 3.

The nonadhering material can involve the use of stearin or paraffin. Instead of paper, strip 7 can also be made of another material, for example, plastic. Then, the adhesive tapes 5 can use an adhesive plaster or other adhesive tapes.

To pull off outermost adhesive tape 5 after, in the case of a clothes cleaning roll, it is used up, i.e., the outside of adhesive layer 8 is sufficiently dirty that it will not pick up any more dirt particles, the outermost adhesive tape 5 is grasped in its end section that is provided with the nonadhering material layer 9 and is unwound from adhesive tape roll 4. The grasping of this end section entails no difficulties, because it does not adhere to the other end section of the same adhesive tape 5. When unwinding the outermost adhesive tape 5, the adhesive tape 5 lying under it is not simultaneously unwound because the pull exerted on the immediately underlying adhesive tape 5, when the outermost adhesive tape 5 is pulled off, is directed in the winding direction of the immediately underlying adhesive tape 5.

The turned-under end section 10 prevents the adhesive tape 5 which is first wound on the winding mandrel 3, from slipping during winding since the turned-under end section 10 adheres, by adhesive layer 8, to winding mandrel 3.

It is noted further concerning FIGS. 2 and 3, that, for illustration purposes, the adhesive tapes 5 have been represented in a disproportionately enlarged scale, since the individual layers of adhesive tapes 5 cannot be distinguished on a natural scale.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. An adhesive tape roll suitable for use as a cleaning device, comprising a winding mandrel and a plurality of separate adhesive tapes wound on the winding mandrel; wherein each adhesive tape comprises a strip made of a flexible, nonadhesive material, an adhesive layer being disposed on only one side of the strip and a layer of nonadhering material being provided on a first end section of an opposite side of the strip, said layer of nonadhering material extending over the entire width of the first end section of the strip; wherein the adhesive tapes are wound one on top of another, alternately in one and then an opposite direction around the winding mandrel; wherein each adhesive tape has a length which is greater than a distance around the winding mandrel, including any adhesive tapes thereunder, in a circumferential direction; and wherein the adhesive-free side of each of at least second and subsequent adhesive tapes wound on the winding mandrel face the winding mandrel and have the layer of nonadhering material on said first end releasably engaging the adhesive layer at an overlapped opposite, second end of the same adhesive tape.

2. Adhesive tape roll according to claim 1, wherein the overlapped end sections of each adhesive tape are offset in the circumferential direction of the winding mandrel relative to the overlapped sections of an adjacent, previously wound, adhesive tape.

3. Adhesive tape roll according to claim 2, wherein the adhesive free side of the first-wound adhesive tape faces the winding mandrel; and wherein the second end section of the first-wound adhesive tape is turned under to bring a portion of the adhesive side into contact with the winding mandrel.

4. Adhesive tape roll according to claim 1, wherein the adhesive-free side of the first-wound adhesive tape faces the winding mandrel; and wherein the second end section of the first-wound adhesive tape is turned under to bring a portion of the adhesive side into contact with the winding mandrel.

5. Adhesive tape roll according to claim 1, wherein the flexible, nonadhesive material is paper.

6. Adhesive tape roll according to claim 5, wherein said paper is a crepe paper.

7. Adhesive tape roll according to claim 5, wherein the nonadhering material is selected from the group consisting of stearin and paraffin.

8. Adhesive tape roll according to claim 5, wherein the overlapped end sections of each adhesive tape are offset in the circumferential direction of the winding mandrel relative to the overlapped section of an adjacent, previously wound, adhesive tape.

9. Adhesive tape roll according to claim 8, wherein the adhesive-free side of the first-wound adhesive tape faces the winding mandrel; and wherein the second end section of the first-wound adhesive tape is turned under to bring a portion of the adhesive side into contact with the winding mandrel.

10. Adhesive tape roll according to claim 5, wherein the adhesive-free side of the first-wound adhesive tape faces the winding mandrel; and wherein the second end section of the first-wound adhesive tape is turned under to bring a portion of the adhesive side into contact with the winding mandrel.

11. Adhesive tape roll according to claim 1, wherein said winding mandrel comprises a hollow cylindrical shape.

12. Adhesive tape roll according to claim 11, wherein said winding mandrel is made of stiff cardboard.

13. A clothes cleaning device having a handle and an adhesive tape roll removably and rotatably mounted on the winding mandrel; wherein each adhesive tape comprises a strip made of a flexible, nonadhesive material, an adhesive layer being disposed on only one side of the strip and, a layer of nonadhering material being provided on a first end section of an opposite side of the strip, said layer of nonadhering material extending over the entire width of the first end section of the strip; wherein the adhesive tapes are wound one on top of another, alternately in one and then an opposite direction around the winding mandrel; wherein each adhesive tape has a length which is greater than a distance around the winding mandrel, including any adhesive tapes thereunder, in a circumferential direction; and wherein the adhesive-free side of each of at least second and subsequent adhesive tapes wound on the winding mandrel face the winding mandrel and have the layer of nonadhering material on said first end releasably engaging the adhesive layer at an overlapped opposite, second end of the same adhesive tape.

14. A clothes cleaning device according to claim 13, wherein said winding mandrel comprises a hollow cylindrical shape and is rotatably mounted on said extension of the handle.

15. A clothes cleaning device according to claim 13, wherein the overlapped end sections of each adhesive tape are offset in the circumferential direction of the winding mandrel relative to the overlapped sections of an adjacent, previously wound, adhesive tape.

* * * * *